July 14, 1931. J. GARBAREK 1,814,211
TOOL HOLDER
Filed Feb. 21, 1929
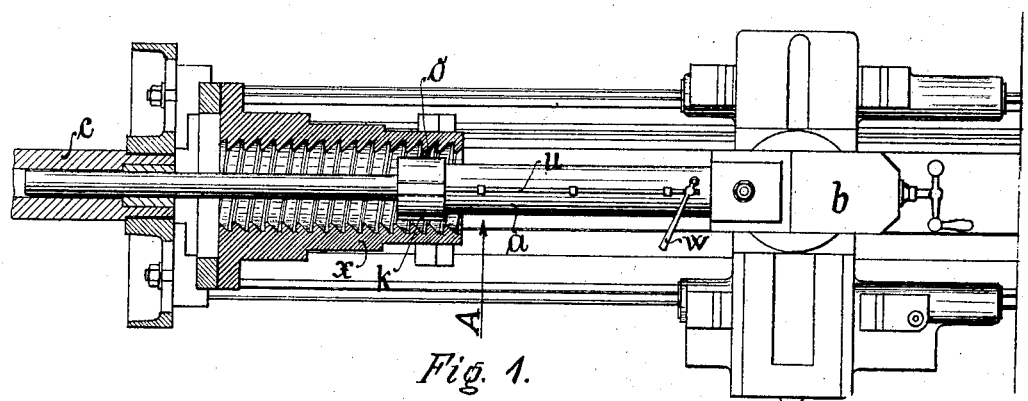
Fig. 1.
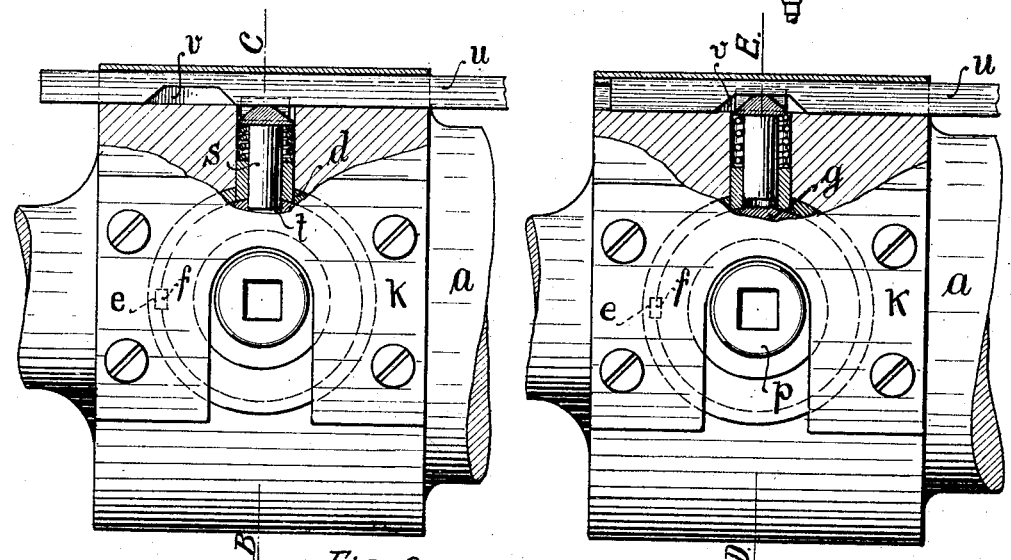
Fig. 2. Fig. 3.
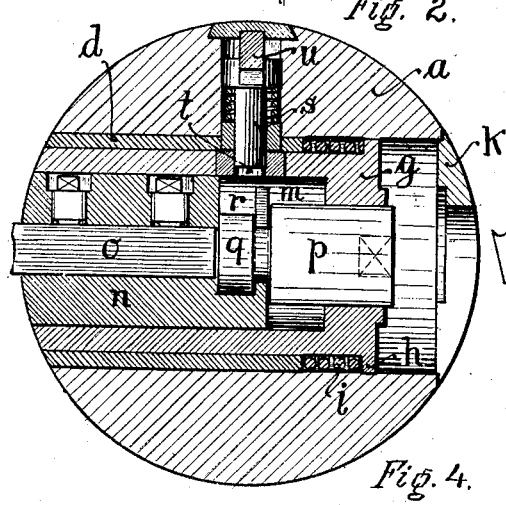 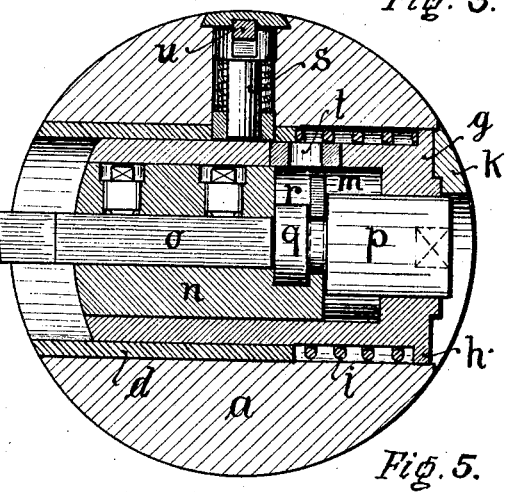
Fig. 4. Fig. 5.

Patented July 14, 1931

1,814,211

UNITED STATES PATENT OFFICE

JOSEF GARBAREK, OF WALSUM-ON-THE-RHINE, GERMANY

TOOL HOLDER

Application filed February 21, 1929, Serial No. 341,776, and in Germany November 20, 1926.

This invention relates to a tool holder for boring blanks or for cutting screw threads into these borings, said holder being clamped on the slide rest and guided in the spindle boring of the turning lathe; the cutting tool being mounted in a separate clasp nut in the tool holder in such a manner that, after the termination of the cutting, it jumps back automatically into the clasp nut.

Tool holders have become known, in which the cutting tool can be brought by hand out of the engaging position by the tool being pushed forward and backward by a system of rods or pushed forward by an adjusting screw through an intermediate element and pushed back by a spring only after the adjusting screw has been loosened.

These known arrangements require the full attention of the workman at the termination of the cutting for lifting the tool out of the engaging position.

In comparison with these known arrangements the tool holder according to the invention presents the advantage that the tool is automatically pulled.

An embodiment of the invention is illustrated, by way of example, in the accompanying drawings in which:—

Fig. 1 is an elevation showing the tool holder clamped.

Figs. 2 and 3 show in elevation the clasp chamber viewed in the direction of the arrow line A in Fig. 1 on enlarged scale and partly in section, the elements effecting the disengaging being visible in Fig. 2 in the engaging position and in Fig. 3 in the releasing position.

Figs. 4 and 5 show the clasp nut in section, the tool being pulled back in Fig. 4 and pushed forward in Fig. 5.

The tool holder $a$ is on the one hand fixed on the slide rest $b$ by screwing and guided on the other hand in the hollow shaft $c$ of the face plate. In its middle portion the tool holder $a$ has a transverse bore in which a sleeve $d$ fits tightly (Figs. 2 to 6). This sleeve $d$ extends to approximately ⅔ of the length of the bore and it has in its inner surface a groove $e$ designed to receive a key $f$ (Figs. 4 and 5). By means of this wedge $f$ a block $g$ is secured against rotation so that it can execute in the sleeve $d$ only a reciprocating movement in longitudinal direction. The block $g$ has at its outer end a flange $h$. Between this flange $h$ and the end of the sleeve $d$ a pressure spring $i$ is located. The shifting movement of the block $g$ is limited by a cover plate $k$. In the bore $m$ of the block $g$ a tool holder proper $n$ with the tool $o$ is loosely mounted and connected with an adjusting screw $p$ by means of a collar $q$ of said screw, engaging with an annular groove $r$ in the holder $n$. The block $g$ serves as nut for the adjusting screw $p$.

In the operative position shown in Fig. 5 the block $g$ is pushed forward so far that a spring-controlled pin $s$ in the casing $a$ engages with a hole $t$ in the wall of block $g$ and secures this block in the operative position.

The head of the spring-controlled pin $s$ is V-shaped and bears against a shiftable rod $u$ which has a roof-shaped notch $v$.

In order to release the block $g$ the shiftable rod $u$ has to be shifted so that the notch $v$ registers with the head of pin $s$, this pin being then pressed into this notch through the action of its spring.

By the expanding of the spiral spring $i$ the block $g$ with the tool holder $n$ and the tool $o$ is then pushed back suddenly.

The rod $u$ is automatically shifted when a lever $v$ striking against the blank $x$ is oscillated.

The tool $o$ is adjusted by the adjusting screw $p$.

I claim:—

A tool holder with cutting tool clamped on the slide rest and guided in the bore of the face plate, the cutting tool being automatically returned after the termination of the cut, comprising in combination with a cutting tool, a hollow casing, a transverse sleeve in said casing, a hollow block having a transverse hole in its wall shiftably mounted in said sleeve, a tool holder proper for said tool loosely mounted in said block, a spring-controlled pin in said casing engaging with said hole of said block when the block is in the operative position, a V-shaped head of said pin, a shiftable rod on said casing having a V-shaped notch adapted to register with the head of said spring-controlled pin, and a spiral spring inserted between said sleeve and said block adapted to suddenly push back said block and tool when said block is released by said spring-controlled pin.

In testimony whereof I affix my signature.

JOSEF GARBAREK.